(12) United States Patent
Arora et al.

(10) Patent No.: US 10,789,559 B2
(45) Date of Patent: Sep. 29, 2020

(54) VIRTUALLY ASSISTED TASK GENERATION

(71) Applicant: INTERNATIONAL BUSINESS MACHINES CORPORATION, Armonk, NY (US)

(72) Inventors: Pritpal S. Arora, Bangalore (IN); Bijo S. Kappen, Bangalore (IN); Gopal S. Pingali, Mohegan Lake, NY (US); Adinarayana Sakala, Tirupati (IN)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 15/190,311

(22) Filed: Jun. 23, 2016

(65) Prior Publication Data

US 2017/0372252 A1 Dec. 28, 2017

(51) Int. Cl.
*G06Q 10/06* (2012.01)
(52) U.S. Cl.
CPC ............... *G06Q 10/063112* (2013.01); *G06Q 10/063116* (2013.01)
(58) Field of Classification Search
None
See application file for complete search history.

(56) References Cited

U.S. PATENT DOCUMENTS

| | | | | |
|---|---|---|---|---|
| 5,467,268 A * | 11/1995 | Sisley | ................... | G06Q 10/06 705/7.16 |
| 6,850,895 B2 | 2/2005 | Brodersen et al. | | |
| 7,596,416 B1 * | 9/2009 | Maluf | ................... | G06Q 10/06 700/1 |
| 8,000,453 B2 | 8/2011 | Cooper et al. | | |
| 2001/0027481 A1 * | 10/2001 | Whyel | ................. | G06Q 10/109 709/218 |
| 2007/0043687 A1 | 2/2007 | Bodart et al. | | |
| 2008/0091500 A1 * | 4/2008 | Barber-Mingo | ... | G06Q 10/1095 705/7.19 |

(Continued)

FOREIGN PATENT DOCUMENTS

| | | |
|---|---|---|
| EP | 2342631 | 7/2011 |
| WO | 0143031 | 6/2001 |

OTHER PUBLICATIONS

Smartwatch, wikipedia webpages, Jun. 16, 2016 https://web.archive.org/web/20160617162626/https://en.wikipedia.org/wiki/Smartwatch#2016.*

(Continued)

*Primary Examiner* — Octavian Rotaru
(74) *Attorney, Agent, or Firm* — Schmeiser, Olsen & Watts; Mark C. Vallone

(57) ABSTRACT

A method and system for automatically generating a virtual assisted task is provided. The method includes establishing secure connections between a hardware device and databases external to the hardware device. A group of tasks associated with an individual are identified and available timeframes associated with an availability of the individual are determined. A first potential score and maximum score for each task are computed. The first potential score is compared to each maximum potential score and in response, a subset of tasks are automatically selected. The subset of tasks are mapped to the available timeframes and results of the mapping a cached within a caching circuit of the hardware device. Results of the caching are presented via the hardware device.

20 Claims, 5 Drawing Sheets

(56) References Cited

U.S. PATENT DOCUMENTS

| | | | |
|---|---|---|---|
| 2009/0063947 A1* | 3/2009 | Anderson | G06Q 10/06314 715/212 |
| 2009/0083644 A1* | 3/2009 | Kimura | G06Q 10/109 715/764 |
| 2009/0182609 A1 | 7/2009 | Kelleher | |
| 2009/0216595 A1* | 8/2009 | Coulomb | G06Q 10/1095 705/7.18 |
| 2009/0241121 A1* | 9/2009 | Nechushtai | G06Q 10/10 718/104 |
| 2010/0162135 A1* | 6/2010 | Wanas | H04L 12/1822 715/753 |
| 2010/0241480 A1* | 9/2010 | Rokhlin | G06Q 10/109 705/7.18 |
| 2011/0268262 A1* | 11/2011 | Jones | H04M 3/42008 379/202.01 |
| 2012/0215578 A1 | 8/2012 | Swierz, III et al. | |
| 2013/0007121 A1* | 1/2013 | Fontenot | G06Q 10/00 709/204 |
| 2013/0054805 A1* | 2/2013 | Lipari | G06Q 10/1091 709/226 |
| 2013/0151430 A1 | 6/2013 | Peters et al. | |
| 2014/0047330 A1* | 2/2014 | Yan | G06F 3/0486 715/273 |
| 2014/0136439 A1* | 5/2014 | Galvin, Jr. | G06Q 10/06311 705/321 |
| 2014/0288990 A1* | 9/2014 | Moore | G06Q 10/107 705/7.19 |
| 2015/0332205 A1* | 11/2015 | Gauthier | G06Q 10/1093 705/7.17 |
| 2017/0091440 A1* | 3/2017 | Nichol | H04W 12/06 |
| 2017/0286888 A1* | 10/2017 | Merg | G07C 5/0808 |

OTHER PUBLICATIONS

Distributed database, wikipedia, archives org, Apr. 12, 2016 https://web.archive.org/web/20160412170518/https://en.wikipedia.org/wiki/Distributed_database.*

Cache computing wikipedia webpages, archives org webpages, May 7, 2016 https://web.archive.org/web/20160507152831/https://en.wikipedia.org/wiki/Cache_%28computing%29.*

CPU cache, wikipedia webpages, archives org, Jun. 11, 2016 https://web.archive.org/web/20160611110615/https://en.wikipedia.org/wiki/CPU_cache.*

* cited by examiner

VIRTUALLY ASSISTED TASK GENERATION

FIELD

The present invention relates generally to a method for virtually generating tasks and in particular to a method and associated system for virtually enabling hardware related tasks including replacement of hardware components for various hardware devices.

BACKGROUND

Assigning device maintenance related functions typically includes an inaccurate process with little flexibility. Coordinating multiple parties for multiple repairs typically involves an unreliable process. Associating maintenance related functions with repair related functions may include a complicated process that may be time consuming and require a large amount of resources. Accordingly, there exists a need in the art to overcome at least some of the deficiencies and limitations described herein above.

SUMMARY

A first aspect of the invention provides a virtual assisted task maximization method comprising: establishing, by a processor enabling a connectivity circuit of a hardware device, secure connections between the hardware device and a plurality of databases external to the hardware device; identifying, by the processor based on analysis of specialized parameters, a group of tasks associated with an individual; determining, by the processor, specified available timeframes associated with availability of the individual; computing based on specified skills of the individual, by the processor enabling a computation circuit of the hardware device, a first potential score for each task of the group of tasks; computing, by the processor enabling the computation circuit of the hardware device, a maximum potential score for each the task comparing each the first potential score to each the maximum potential score; automatically selecting based on results of the comparing, by the processor enabling the computation circuit, a subset of tasks of the group of tasks; mapping, by the processor, the subset of tasks to the specified available timeframes; caching within a caching circuit of the hardware device, by the processor, results of the mapping; and presenting via the hardware device, the results of the caching.

A second aspect of the invention provides a computer program product, comprising a computer readable hardware storage device storing a computer readable program code, the computer readable program code comprising an algorithm that when executed by a processor enabling a connectivity circuit of a hardware device implements a virtual assisted task maximization method, the method comprising: establishing, by the processor, secure connections between the hardware device and a plurality of databases external to the hardware device; identifying, by the processor based on analysis of specialized parameters, a group of tasks associated with an individual; determining, by the processor, specified available timeframes associated with availability of the individual; computing based on specified skills of the individual, by the processor enabling a computation circuit of the hardware device, a first potential score for each task of the group of tasks; computing, by the processor enabling the computation circuit of the hardware device, a maximum potential score for each the task; comparing each the first potential score to each the maximum potential score; automatically selecting based on results of the comparing, by the processor enabling the computation circuit, a subset of tasks of the group of tasks; mapping, by the processor, the subset of tasks to the specified available timeframes; caching within a caching circuit of the hardware device, by the processor, results of the mapping; and presenting via the hardware device, the results of the caching.

A third aspect of the invention provides a hardware device comprising a processor coupled to a computer-readable memory unit, the memory unit comprising instructions that when executed by the processor executes a virtual assisted task maximization method comprising: establishing, by the processor enabling a connectivity circuit of the hardware device, secure connections between the hardware device and a plurality of databases external to the hardware device; identifying, by the processor based on analysis of specialized parameters, a group of tasks associated with an individual; determining, by the processor, specified available timeframes associated with availability of the individual; computing based on specified skills of the individual, by the processor enabling a computation circuit of the hardware device, a first potential score for each task of the group of tasks; computing, by the processor enabling the computation circuit of the hardware device, a maximum potential score for each the task; comparing each the first potential score to each the maximum potential score; automatically selecting based on results of the comparing, by the processor enabling the computation circuit, a subset of tasks of the group of tasks; mapping, by the processor, the subset of tasks to the specified available timeframes; caching within a caching circuit of the hardware device, by the processor, results of the mapping; and presenting via the hardware device, the results of the caching.

The present invention advantageously provides a simple method and associated system capable of assigning device maintenance related functions.

BRIEF DESCRIPTION OF THE DRAWINGS

FIG. 3, including

DETAILED DESCRIPTION

Figure 1:
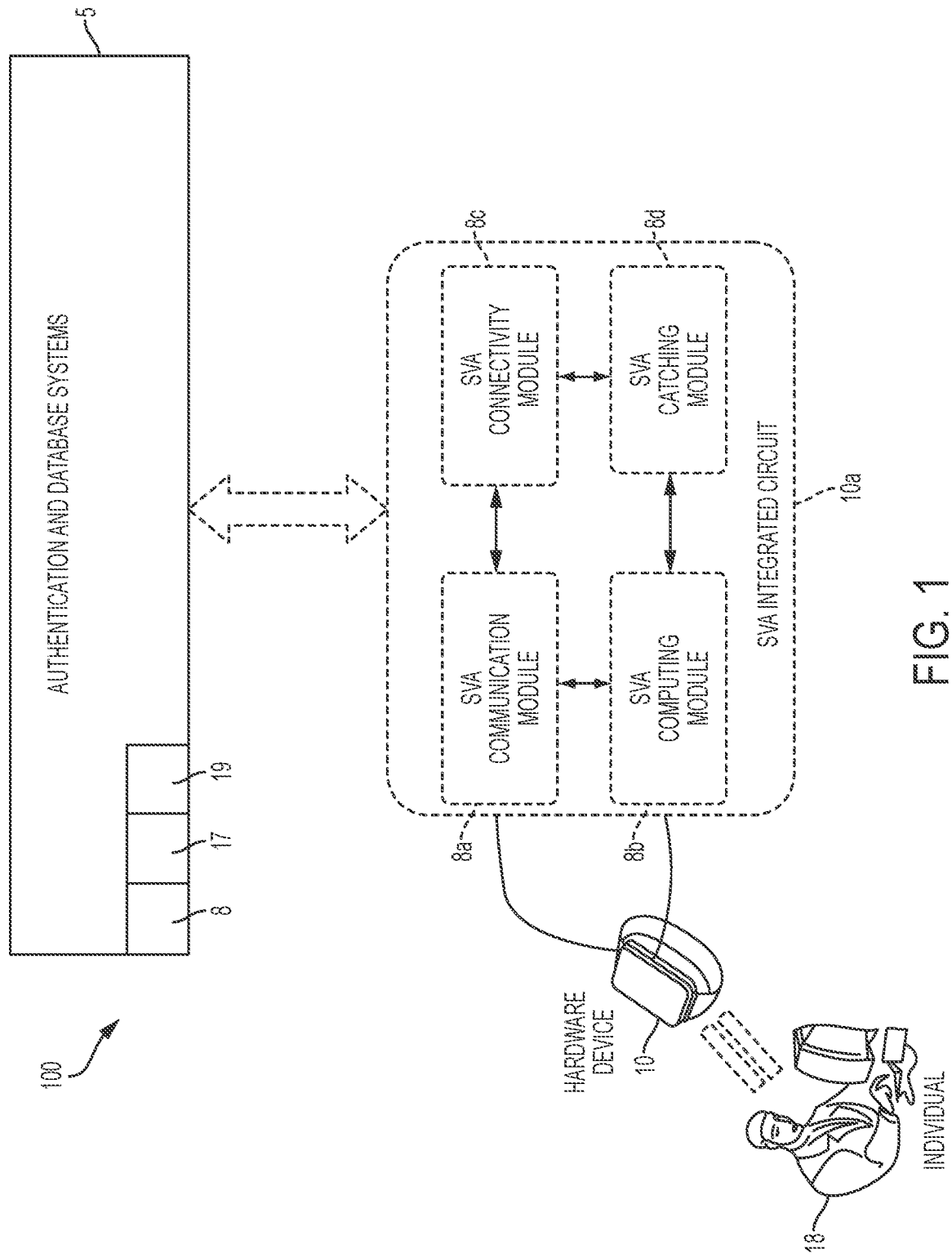
FIG. 1 illustrates a system for virtually enabling hardware related tasks, in accordance with embodiments of the present invention.

FIG. 1 illustrates a system 100 for virtually enabling hardware related tasks, in accordance with embodiments of the present invention. System 100 enables a process for assisting an individual 18 (associated with an entity) with a virtual hardware component (e.g., hardware device 10) for identifying high potential opportunities/tasks to maximize a task contribution by the individual by:

1. Identifying a most relevant opportunity/task for an individual based on parameters such as skills, preferences, work history, past collaboration, past opportunities, availability, etc. A score is calculated for each opportunity.

2. Mapping selected opportunities for an individual based on the individual's availability timeframe and the individual is presented with recommended list of opportunities.

3. Identifying potential collaborators for high value creation opportunities by computing a potential collaboration score for an opportunity for each collaborator and recommending a highest value collaborator(s) to the individual.

System 100 of FIG. 1 includes a hardware device 10 (of individual 18) in communication with authentication and database systems 5 via a network 7. Hardware device 10 and authentication and database systems 5 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware device 10 and authentication and database systems 5 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit such as SVA integrated circuit 10a designed for only implementing an automated process for virtually enabling hardware related tasks). Authentication and database systems 5 may comprise multiple differing authentication and database systems each located in differing remote locations. Alternatively, authentication and database systems 5 may comprise multiple differing authentication and database systems all located at a single location. Each of authentication and database systems 5 includes a memory system 8, software 17, and control hardware 19 (all sensors, interfaces, and associated control hardware for enabling software 17 to communicate with hardware device 10 and execute a process for virtually enabling hardware related tasks. Control hardware 19 may include sensors. Sensors may include, inter alia, GPS sensors, optical sensors, weight sensors, etc. The memory system 8 (e.g., a database) may include a single memory system. Alternatively, the memory system 8 may include a plurality of memory systems. Hardware device 10 may comprise any type of hard communication device including, inter alia, a smart phone, a wearable device (e.g., a smart watch), a specialized device (comprising embedded circuitry for only performing an automated process for virtually enabling hardware related tasks). Hardware device 10 comprises an internal (specialized) smart virtual assistant (SVA) integrated circuit (IC) chip comprising a SVA communication module 8a (i.e., circuit), a SVA computing module 8b (i.e., circuit), a SVA connectivity module 8c (i.e., circuit), and a SVA caching module 8d (i.e., circuit). Each of SVA communication module 8a, SVA computing module 8b, SVA connectivity module 8c, and SVA caching module 8d comprises discrete specialized (analog and digital) circuitry for performing independent specialized functionality.

SVA communication module 8a comprises specialized circuitry for maintaining an optimized communication channel (e.g., via specialized ports and interfaces) between various authentication and database systems (e.g., authentication and database systems 5) and hardware device. 10. Additionally, SVA communication module 8a comprises specialized circuitry for maintaining an optimized communication channel (e.g., via specialized ports and interfaces) between and an enterprise rapid value generator system 21.

SVA compute module 8b comprises specialized circuitry for: computing various scores and value contributions; and identifying opportunities with maximum value derivations, collaboration scores, etc.

SVA connectivity module 8c comprises specialized circuitry and ports/interfaces for establishing secure connections with authentication and database systems as well as employee databases, Emp calendars, performance databases, opportunities & various collaborator based engagement systems, etc.

SVA caching module 8d comprises specialized circuitry for caching various database pre-fetches within hardware device 10 for specific individuals for reducing enterprise (network related) traffic.

System 100 of FIG. 1 enables a process for virtually enabling hardware related tasks by:

1. Enabling an individual (e.g., individual 18) in an enterprise to maximize technical value contributions in a technical system for rapid value creation by analyzing existing opportunities to identify opportunities (e.g., hardware related tasks) most relevant to the individual. Additionally, an individual specific potential score for calculated for each opportunity resulting in a process for automatically selecting a subset of opportunities that maximally bridge a gap between an individual's target technical enterprise rating and the individual's current technical enterprise rating, The selected opportunities are automatically mapped to the individual's available time windows for completing a hardware related task such as hardware replacement. The individual is presented with the recommended/selected opportunities and associated time windows.

2. Calculating an individual specific potential score (WPS) for an associated opportunity based on: an associated value, a reward associated with the opportunity, a specification match with respect to the individual's skills, preferences, past successes and solution submissions, a timeframe associated with the opportunity versus the individual's available time windows with respect to a selected opportunity, and an estimate of the time with respect to the individual and associated opportunity.

3. Enabling an individual in an enterprise to: identify high value collaborators for value creation opportunities by identifying requesting collaborators and other candidate collaborators for a selected opportunity; compute a worker opportunity collaboration score for the identified opportunity for each collaborator; recommend a highest value collaborator(s) to the individual for the selected opportunity; and automatically complete a hand shake process with collaborator(s) with respect to the identified opportunity.

4. Computing (via computing module 8b of hardware device 10) a worker opportunity collaborator score (WOCS) for each specific collaborator with respect to each specific opportunity by: analyzing collaborator skills with respect to an individual's skills for a selected opportunity; and overlapping and associating time windows between: the collaborator and the individual, a number of and success rating of past collaborations between the individual and the collaborator, an overall success between the collaborator, the individual's own rating for the collaborator, and additional ratings for the collaborator.

5. Identifying opportunities for termination based on work pending, previous estimates of work completion, employee previous speed of termination of engagement. An estimate associated with an amount of time available for an individual with respect to more opportunities is generated.

6. Collaboration between additional hardware devices smart vying for similar opportunities.

Figure 2:
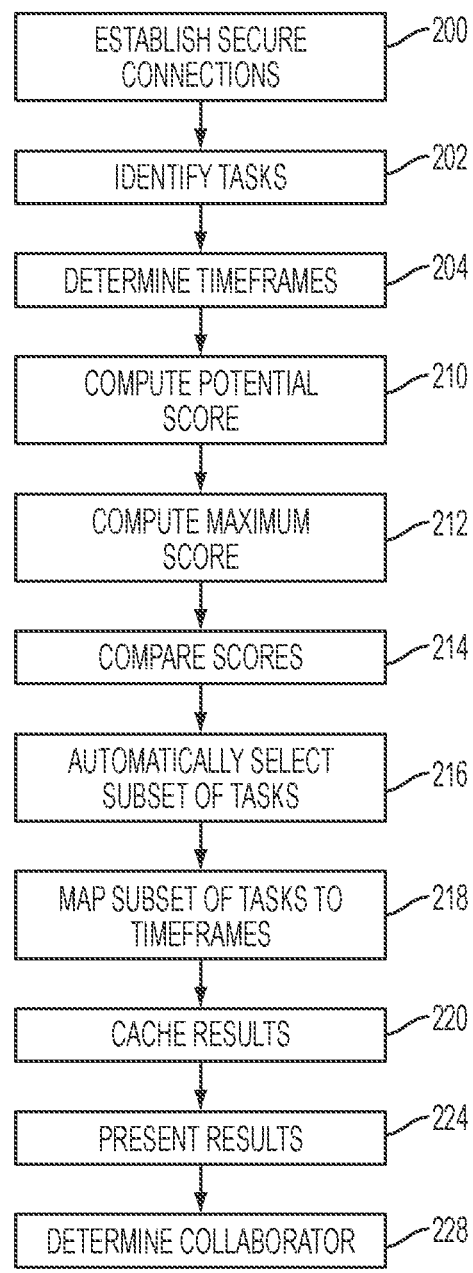
FIG. 2 illustrates an algorithm detailing a process flow enabled by the system of FIG. 1 for virtually enabling hardware related tasks, in accordance with embodiments of the present invention.

FIG. 2 illustrates an algorithm detailing a process flow enabled by system 100 of FIG. 1 for virtually enabling hardware related tasks, in accordance with embodiments of the present invention. Each of the steps in the algorithm of FIG. 2 may be enabled and executed in any order by a computer processor(s) or any type of specialized hardware executing computer code. In step 200, secure connections between a hardware device (e.g., hardware device 10 of FIG. 1) and databases (e.g., authentication and database systems 5 of FIG. 1) external to the hardware device. In step 202, a group of tasks associated with an individual are identified based on analysis of specialized parameters. The tasks may include replacing hardware components of various hardware devices. In step 204, specified available timeframes associated with availability of the individual are determined. In step 210, a first potential score for each task of the group of tasks is computed based on specified skills (of the individual) a specialized computation circuit of the hardware device. Additionally, each first potential score may be computed based on a value associated with each task, a reward associated with each task, a time period associated with each task with respect to the specified available timeframes, and a time period estimate associated with the individual addressing each task. In step 212, a maximum potential score for each task is computed by a specialized computation circuit of the hardware device. In step 214, each first potential score is compared to each maximum potential score. In step 216, a subset of tasks (of the group of tasks) is automatically selected based on results of the comparison of step 214. In step 218, the subset of tasks is mapped to the specified available timeframes. In step 220, results of the mapping process of step 218 are cached within a specialized caching circuit of the hardware device. In step 224, results of the caching are presented via the hardware device. In step 228, a worker opportunity collaborator score (WOCS) (for each specified collaborator of a plurality of collaborators associated with each task) is computed (via a computation circuit) by:
1. Analyzing each collaborator's skills with respect to skills of the individual for each task.
2. Overlapping time frames between each specified collaborator and the individual and success ratings for past collaborations between each specified collaborator and the individual.
3. Re-computing based on the WOCS (via the computation circuit) an updated potential score for each task.

Additionally (in step 228), a highest ranked collaborator with respect to the individual may be selected and associated with another selected collaborator.

Figure 3A:
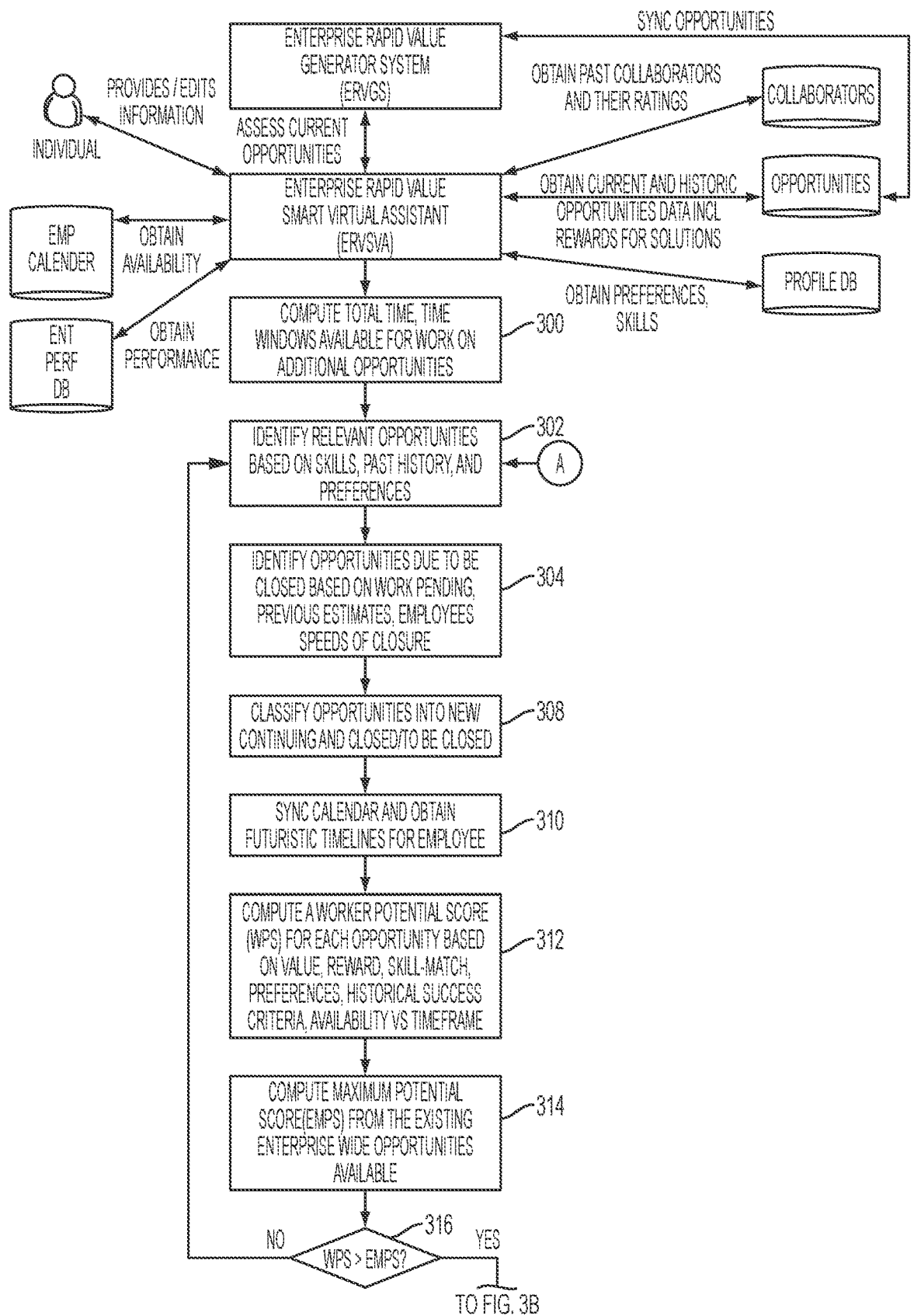
FIG. 3A and FIG. 3B, illustrates an algorithm further detailing the process flow of FIG. 2 for virtually enabling hardware related tasks, in accordance with embodiments of the present invention.
Figure 3B:
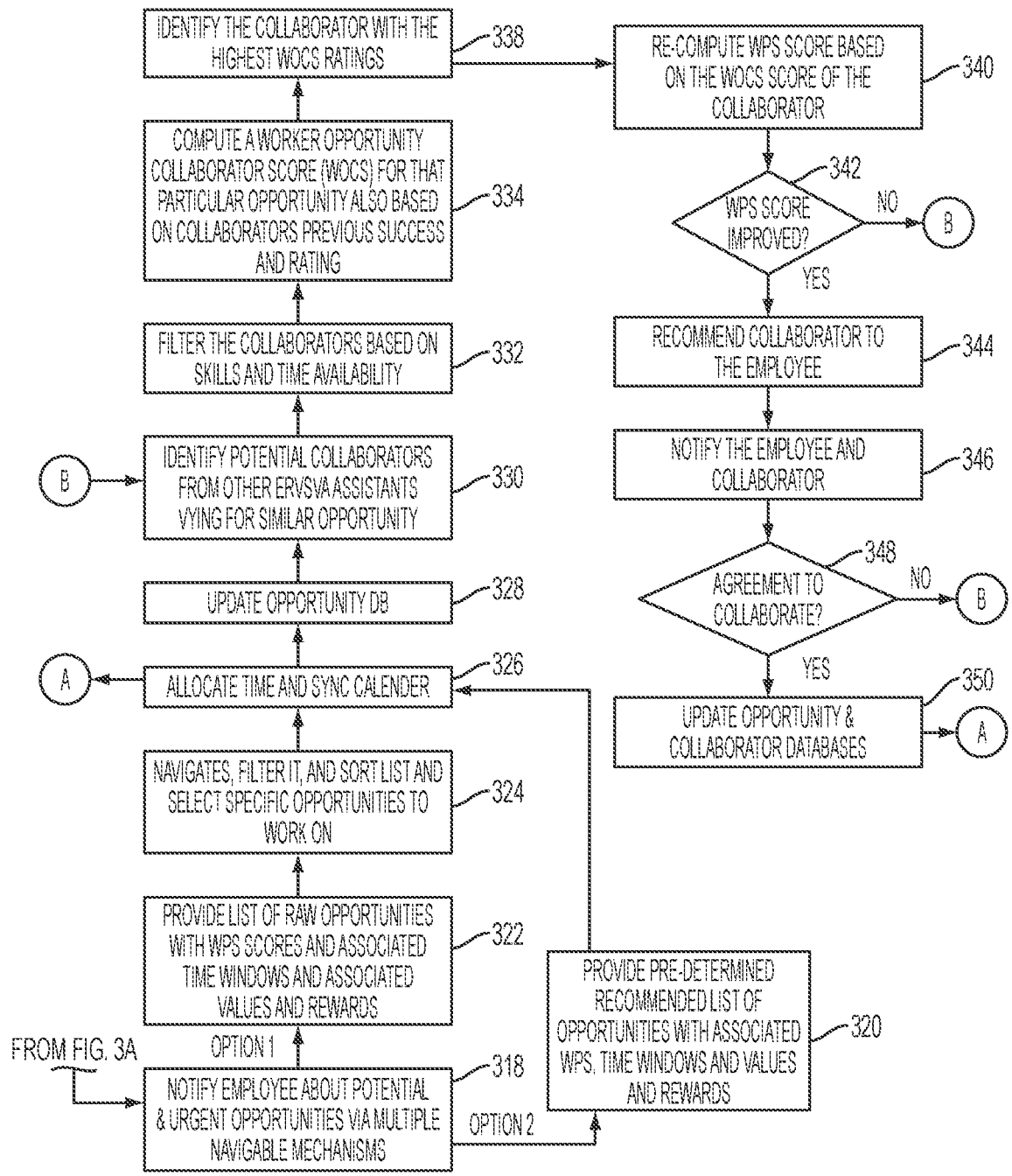

FIG. 3, including FIG. 3A and FIG. 3B, illustrates an algorithm further detailing the process flow of FIG. 2 for virtually enabling hardware related tasks, in accordance with embodiments of the present invention. Each of the steps in the algorithm of FIG. 3 may be enabled and executed in any order by a computer processor(s) or any type of specialized hardware executing computer code. The algorithm of FIG. 3 is executed by a (smart) virtual assistant on an enterprise individual's hardware device (e.g., hardware device 10 of FIG. 1) in order to assist the individual to prioritize appropriate opportunities among numerous value creation opportunities. The virtual assistant obtains all current work related associated with the individual and obtains a score for the individual with respect to an enterprise performance rating database with respect to a target.

In step 300, the virtual assistant computes a total time, timeframe, and time window associated with a worker's (e.g., an individual) availability with respect to completing work related assignments (e.g., hardware design, replacement, and/or maintenance functions) based on existing assignment allocations with respect to an associated calendar and preferences. A list of all time windows (for the individual) currently allocated to alternative opportunities is retrieved (e.g., from an EMP calendar database). Additionally, the following information is retrieved:
1. Skills, expertise areas, and preferred project areas for the worker (e.g., from a profile database).
2. All past opportunities and solutions associated with the worker including solutions associated with rewards.
3. A list of all past opportunity collaborators and an associated worker-specific rating for a value of a collaborator based on past successes and a worker's own explicit rating.

In step 302, the virtual assistant retrieves a list (i.e., an updated list of value creation opportunities) and evaluates the list with respect to a maintained database of opportunities. Additionally, the virtual assistant identifies (from the list of opportunities) all relevant opportunities (with respect to the worker) by matching the opportunities with associated skills, past history, and preferences for the worker. In step 304, all opportunities for termination are identified. In step 308, a list of the relevant opportunities is classified into continuing opportunities, new opportunities, and closed opportunities. In step 310, the worker is notified of all closed opportunities and all associated worker time windows allocated to the closed opportunities are released. In step 312, a worker-specific potential score (WPS) is calculated for every opportunity based on: an associated value and reward; a specification match of the opportunity with respect to the worker's skills, preferences, past successes and solution submissions; a timeframe associated with the opportunity versus the worker's time windows available for the opportunity; and an estimate a time for addressing the opportunity. In response, the virtual assistant generates a list of opportunities with an associated WPS and a list of candidate worker time windows associated with the opportunity. In step 314, a set of opportunities maximizing a cumulative WPS is calculated (i.e., EMPS) thereby ensuring that the worker is associated with only one opportunity at any given time available to the worker. In step 316, it is determined if the WPS is greater than the EMPS (for every continuing opportunity associated with the worker). If in step 316, it is determined that the WPS is not greater than the EMPS then step 302 is repeated. If in step 316, it is determined that the WPS is greater than the EMPS then in step 318, the worker is provided with multiple navigation mechanisms for selection if associated opportunities. Step 318 provides two different optional paths. In step 320 (a first optional path), a pre-determined recommended list comprising opportunities and associated WPS, time windows, and values and rewards is generated and the worker is notified of high potential and urgent opportunities based on worker preferences and step 326 is executed as described, infra. In step 322 (a second optional path), a raw list of opportunities (comprising WPS scores and associated time windows, values, and rewards is generated. In step 324, the worker may navigate, filter, and sort the list (generated in step 322) and select specific opportunities. For example, an automatic message, audio notification, or screen prompt may be presented to a worker when the worker accesses a calendar etc. When the worker selects an opportunity for work (with respect to the calendar), the virtual assistant updates the worker's opportunity database, reserves all associated time windows for the selected opportunity, and updates the worker's calendar. In step 326, a time is allocated to the opportunity and synced to the worker's calendar and step 302 is repeated to analyze additional opportunities. In step an opportunity database is updated in accordance with step 326. In step 330, potential collaborators from additional virtual assistants vying for a similar opportunity are identified. In step 332, the potential collaborators are filtered based on associated skills and timeframe availability. In step 334, the virtual assistant verifies and analyzes collaboration requests and identifies potential collaborators. When a collaboration request is applied to the worker for a specific opportunity, the virtual assistant computes a worker opportunity collaborator score (WOCS) for the specific opportunity by analyzing the collaborator's skills with respect to the worker's skills for the specific opportunity thereby overlapping and complementing time windows between the collaborator and the worker, a number of success ratings for past collaborations between the worker and the collaborator, overall successes of the collaborator, a worker's own rating of the collaborator, and additional ratings for the collaborator. In step 338, a collaborator with a highest WOCS rating is identified. In step 340, a WPS score for the worker is recomputed based on a WOCS score of the collaborator and if the WOCS is greater than a predetermined threshold, the virtual assistant computes a WPS score for the opportunity with and without collaboration. If the WPS score is greater than a threshold compared to the WPS score without collaboration, the virtual assistant recommends the collaborator to the user. If multiple collaboration requests are identified, the virtual assistant computes the WOCS score and WPS score for each collaborator and recommends top potential collaborators to the user for the selected opportunity. When the worker selects a collaborator, the assistant automatically conveys acceptance of the opportunity to the collaborator, completes a handshake process, updates the worker's opportunity database, and step 302 is repeated. In step 342, it is determined if the WPS score has improved over previous WPS scores. If in step 342, it is determined if the WPS score has not improved over previous WPS scores, then step 330 is repeated. If in step 342, it is determined if the WPS score has improved over previous WPS scores, then in step 344 (i.e., based on the worker's preference), the virtual agent additionally proactively recommends collaborators by querying a database of collaborators and analyzing associated WCOS scores for each potential collaborator. In step 346, the virtual agent automatically notifies high potential collaborators associate with the worker's interest with respect to collaborating. In step 348, it is determined if an agreement has been reached between the worker and the high potential collaborators. If in step 348, it is determined that an agreement has not been reached between the worker and the high potential collaborators then step 330 is repeated. If in step 348, it is determined that an agreement has been reached between the worker and the high potential collaborators then a handshake process is executed and in step 350, a worker opportunity database and related opportunity and collaborator databases are updated and step 302 is repeated.

Figure 4:
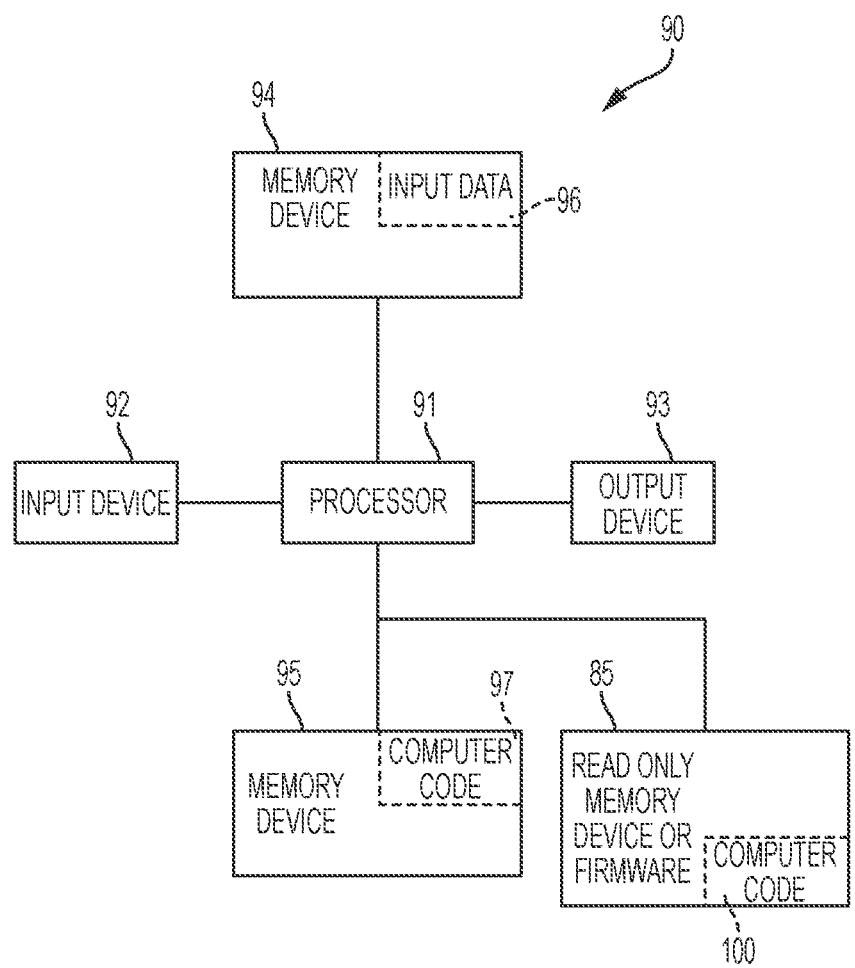
FIG. 4 illustrates a computer system used by the system of FIG. 1 for enabling a process for virtually enabling hardware related tasks, in accordance with embodiments of the present invention.

FIG. 4 illustrates a computer system 90 (e.g., authentication and database systems 5 and hardware device 10) used by or comprised by the system of FIG. 1 for virtually enabling hardware related tasks, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3) for enabling a process for enabling a process for supplying items to robotic apparatuses on an assembly line. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIGS. 2-3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for virtually enabling hardware related tasks. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for enabling a process for virtually enabling hardware related tasks. In another embodiment, the invention provides a business method that performs the process steps of the invention on a subscription, advertising, and/or fee basis. That is, a service supplier, such as a Solution Integrator, could offer to enable a process for virtually enabling hardware related tasks. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A virtual assisted task maximization and implementation method comprising:
    establishing, by a processor enabling a connectivity circuit comprised by a specialized smart virtual assistant (SVA) integrated circuit (IC) chip comprising a SVA communication module of a special purpose hardware device, secure connections between said special purpose hardware device and a plurality of databases external to said special purpose hardware device, wherein said special purpose hardware device comprises electronic circuitry comprising a programmable logic array utilizing state information of specialized firmware program code configured to execute specialized software for personalizing said electronic circuitry for performing said virtual assisted task maximization method;
    maintaining, by said processor executing said SVA communication module, an optimized communication channel, via specialized ports and interfaces, between said plurality of databases and said special purpose hardware device;
    maintaining, by said processor executing said SVA communication module, another optimized communication channel, via the specialized ports and interfaces, between said special purpose hardware device and an enterprise rapid value generator system;
    identifying, by said processor based on analysis of specialized parameters, a group of tasks associated with an individual;
    determining, by said processor, specified available timeframes associated with an availability of said individual with respect to said group of tasks;
    computing based on specified skills of said individual, by said processor enabling a computation circuit of said special purpose hardware device, a first potential score for each task of said group of tasks;
    computing, by said processor enabling said computation circuit of said special purpose hardware device, a maximum potential score for each said task, wherein said maximum potential score comprises an improved score with respect to said first potential score;
    comparing each said first potential score to each said maximum potential score;
    automatically selecting based on results of said comparing, by said processor enabling said computation circuit, a subset of tasks of said group of tasks;
    mapping, by said processor, said subset of tasks to said specified available timeframes;
    caching within a specialized caching circuit of said special purpose hardware device, by said processor, results of said mapping;
    additionally caching within said specialized caching circuit, various database pre-fetches of said special purpose hardware device for reducing enterprise network related traffic with respect to said special purpose hardware device;
    presenting via said hardware device, said results of said caching;
    enabling, by said processor, a collaboration between additional hardware devices competing for similar opportunities; and
    directing, by said computer processor, said individual such that said individual proceeds to execute and complete work related assignments associated with said subset of tasks implementing solutions for hardware design, hardware replacement, and hardware maintenance functions based on existing assignment allocations with respect to an associated calendar and preferences.

2. The method of claim 1, wherein said computing each said first potential score is further based on a value associated with each said task, a reward associated with each said task, a time period associated with each said task with respect to said specified available timeframes, and a time period estimate associated with said individual addressing each said task.

3. The method of claim 1, further comprising:
    computing, by said processor enabling said computation circuit, a worker opportunity collaborator score (WOCS) for each specified collaborator of a plurality of collaborators associated with each said task by: analyzing each said collaborator's skills with respect to skills of said individual for each said task, and overlapping time frames between each specified collaborator and said individual and success ratings for past collaborations between each specified collaborator and said individual; and further
    re-computing based on said WOCS, by said processor enabling said computation circuit, an updated potential score for each task of said group of tasks.

4. The method of claim 3, further comprising:
    recommending, by said processor, a highest ranked collaborator of said plurality of collaborators with respect to said individual;
    selecting by said processor in response to a selection by said individual, a first collaborator of said plurality of collaborators; and
    associating, by said processor, said highest ranked collaborator with said first collaborator.

5. The method of claim 1, wherein said hardware device comprises a wearable device.

6. The method of claim 1, further comprising:
    performing said subset of tasks during said specified available timeframes.

7. The method of claim 1, wherein said tasks comprise replacing hardware components of various hardware devices.

8. The method of claim 1, further comprising:
    identifying, by said processor tasks of said group of tasks to be eliminated based on pending tasks, prior task estimates, a rate of closure with respect to said group of tasks, and said availability of said individual with respect to said group of tasks.

9. The method of claim 1, further comprising:
    providing at least one support service for at least one of creating, integrating, hosting, maintaining, and deploying computer-readable code in the hardware device, said code being executed by the computer processor to implement: said establishing, said identifying, said determining, said computing said first potential score, said computing said maximum potential score, said comparing, said automatically selecting, said mapping, said caching, and said presenting.

10. A computer program product, comprising a computer readable hardware storage device storing a computer readable program code, said computer readable program code comprising an algorithm that when executed by a processor enabling a connectivity circuit comprised by a specialized smart virtual assistant (SVA) integrated circuit (IC) chip comprising a SVA communication module of a special purpose hardware device implements a virtual assisted task maximization and implementation method, said method comprising:

establishing, by said processor, secure connections between said special purpose hardware device and a plurality of databases external to said special purpose hardware device, wherein said special purpose hardware device comprises electronic circuitry comprising a programmable logic array utilizing state information of specialized firmware program code configured to execute specialized software for personalizing said electronic circuitry for performing said virtual assisted task maximization method;

maintaining, by said processor executing said SVA communication module, an optimized communication channel, via specialized ports and interfaces, between said plurality of databases and said special purpose hardware device;

maintaining, by said processor executing said SVA communication module, another optimized communication channel, via the specialized ports and interfaces, between said special purpose hardware device and an enterprise rapid value generator system;

identifying, by said processor based on analysis of specialized parameters, a group of tasks associated with an individual;

determining, by said processor, specified available timeframes associated with an availability of said individual with respect to said group of tasks;

computing based on specified skills of said individual, by said processor enabling a computation circuit of said special purpose hardware device, a first potential score for each task of said group of tasks;

computing, by said processor enabling said computation circuit of said special purpose hardware device, a maximum potential score for each said task, wherein said maximum potential score comprises an improved score with respect to said first potential score;

comparing each said first potential score to each said maximum potential score;

automatically selecting based on results of said comparing, by said processor enabling said computation circuit, a subset of tasks of said group of tasks;

mapping, by said processor, said subset of tasks to said specified available timeframes;

caching within a specialized caching circuit of said special purpose hardware device, by said processor, results of said mapping;

additionally caching within said specialized caching circuit, various database pre-fetches of said special purpose hardware device for reducing enterprise network related traffic with respect to said special purpose hardware device;

presenting via said hardware device, said results of said caching;

enabling, by said processor, a collaboration between additional hardware devices competing for similar opportunities; and directing, by said computer processor, said individual such that said individual proceeds to execute and complete work related assignments associated with said subset of tasks implementing solutions for hardware design, hardware replacement, and hardware maintenance functions based on existing assignment allocations with respect to an associated calendar and preferences.

11. The computer program product of claim 10, wherein said computing each said first potential score is further based on a value associated with each said task, a reward associated with each said task, a time period associated with each said task with respect to said specified available timeframes, and a time period estimate associated with said individual addressing each said task.

12. The computer program product of claim 10, wherein said method further comprises:

computing, by said processor enabling said computation circuit, a worker opportunity collaborator score (WOCS) for each specified collaborator of a plurality of collaborators associated with each said task by: analyzing each said collaborator's skills with respect to skills of said individual for each said task, and overlapping time frames between each specified collaborator and said individual and success ratings for past collaborations between each specified collaborator and said individual; and further re-computing based on said WOCS, by said processor enabling said computation circuit, an updated potential score for each task of said group of tasks.

13. The computer program product of claim 12, wherein said method further comprises:

recommending, by said processor, a highest ranked collaborator of said plurality of collaborators with respect to said individual;

selecting by said processor in response to a selection by said individual, a first collaborator of said plurality of collaborators; and associating, by said processor, said highest ranked collaborator with said first collaborator.

14. The computer program product of claim 10, wherein said hardware device comprises a wearable device.

15. The computer program product of claim 10, wherein said method further comprises:

performing said subset of tasks during said specified available timeframes.

16. The computer program product of claim 10, wherein said tasks comprise replacing hardware components of various hardware devices.

17. The computer program product of claim 10, wherein said method further comprises:

identifying, by said processor tasks of said group of tasks to be eliminated based on pending tasks, prior task estimates, a rate of closure with respect to said group of tasks, and said availability of said individual with respect to said group of tasks.

18. A special purpose hardware device comprising a processor coupled to a computer-readable memory unit, said memory unit comprising instructions that when executed by the processor executes a virtual assisted task maximization and implementation method comprising:

establishing, by said processor enabling a connectivity circuit comprised by a specialized smart virtual assistant (SVA) integrated circuit (IC) chip comprising a SVA communication module of said special purpose hardware device, secure connections between said special purpose hardware device and a plurality of databases external to said special purpose hardware device, wherein said special purpose hardware device comprises electronic circuitry comprising a programmable logic array utilizing state information of specialized firmware program code configured to execute specialized software for personalizing said electronic circuitry for performing said virtual assisted task maximization method;

maintaining, by said processor executing said SVA communication module, an optimized communication channel, via specialized ports and interfaces, between said plurality of databases and said special purpose hardware device;

maintaining, by said processor executing said SVA communication module, another optimized communication channel, via the specialized ports and interfaces, between said special purpose hardware device and an enterprise rapid value generator system;

identifying, by said processor based on analysis of specialized parameters, a group of tasks associated with an individual;

determining, by said processor, specified available timeframes associated with an availability of said individual with respect to said group of tasks;

computing based on specified skills of said individual, by said processor enabling a computation circuit of said special purpose hardware device, a first potential score for each task of said group of tasks;

computing, by said processor enabling said computation circuit of said special purpose hardware device, a maximum potential score for each said task, wherein said maximum potential score comprises an improved score with respect to said first potential score;

comparing each said first potential score to each said maximum potential score;

automatically selecting based on results of said comparing, by said processor enabling said computation circuit, a subset of tasks of said group of tasks;

mapping, by said processor, said subset of tasks to said specified available timeframes;

caching within a specialized caching circuit of said special purpose hardware device, by said processor, results of said mapping;

additionally caching within said specialized caching circuit, various database pre-fetches of said special purpose hardware device for reducing enterprise network related traffic with respect to said special purpose hardware device;

presenting via said hardware device, said results of said caching;

enabling, by said processor, a collaboration between additional hardware devices competing for similar opportunities; and directing, by said computer processor, said individual such that said individual proceeds to execute and complete work related assignments associated with said subset of tasks implementing solutions for hardware design, hardware replacement, and hardware maintenance functions based on existing assignment allocations with respect to an associated calendar and preferences.

19. The hardware device of claim 18, wherein said computing each said first potential score is further based on a value associated with each said task, a reward associated with each said task, a time period associated with each said task with respect to said specified available timeframes, and a time period estimate associated with said individual addressing each said task.

20. The hardware device of claim 18, wherein said method further comprises:

computing, by said processor enabling said computation circuit, a worker opportunity collaborator score (WOCS) for each specified collaborator of a plurality of collaborators associated with each said task by: analyzing each said collaborator's skills with respect to skills of said individual for each said task, and overlapping time frames between each specified collaborator and said individual and success ratings for past collaborations between each specified collaborator and said individual; and further re-computing based on said WOCS, by said processor enabling said computation circuit, an updated potential score for each task of said group of tasks.

* * * * *